United States Patent
Horiguchi et al.

(10) Patent No.: US 10,994,575 B2
(45) Date of Patent: May 4, 2021

(54) TIRE

(71) Applicant: Sumitomo Rubber Industries, Ltd., Kobe (JP)

(72) Inventors: Toshiki Horiguchi, Kobe (JP); Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 449 days.

(21) Appl. No.: 15/843,592

(22) Filed: Dec. 15, 2017

(65) Prior Publication Data

US 2018/0178589 A1 Jun. 28, 2018

(30) Foreign Application Priority Data

Dec. 22, 2016 (JP) ............................. JP2016-249687

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01); *B60C 11/1204* (2013.01); *B60C 11/1263* (2013.01); *B60C 2011/0348* (2013.01); *B60C 2011/0351* (2013.01); *B60C 2011/0355* (2013.01); *B60C 2011/0367* (2013.01); *B60C 2011/0369* (2013.01); *B60C 2011/0381* (2013.01); *B60C 2011/1209* (2013.01); *B60C 2011/1213* (2013.01)

(58) Field of Classification Search
CPC ..... B60C 11/12; B60C 11/1204; B60C 11/04; B60C 11/1307; B60C 2011/0381; B60C 2011/0383; B60C 2011/1209; B60C 2011/0365; B60C 2011/0369; B60C 2011/0376; B60C 2011/0379
See application file for complete search history.

(56) References Cited

U.S. PATENT DOCUMENTS

| D762,557 S | * | 8/2016 | Xue | ........................... D12/586 |
| 2009/0255614 A1 | * | 10/2009 | Ebiko | ................ B60C 11/0302 152/209.8 |
| 2010/0252158 A1 | * | 10/2010 | Haga | ................... B60C 11/0306 152/209.18 |
| 2010/0314012 A1 | * | 12/2010 | Hada | ................... B60C 11/0306 152/209.16 |

(Continued)

FOREIGN PATENT DOCUMENTS

| JP | S63137003 | * | 6/1988 |
| JP | 200246426 | * | 2/2002 |
| JP | 2015-168356 A | | 9/2015 |

*Primary Examiner* — Marc C Howell
*Assistant Examiner* — Debjani Roy
(74) *Attorney, Agent, or Firm* — Birch, Stewart, Kolasch & Birch, LLP

(57) ABSTRACT

A tire comprises a center land region 25 provided with center sipes 7 having open ends 7E13 connected with a first center main groove 13 and a first middle land region 23 provided with middle sipes 8 having open ends 8E13 and 8E14 connected with the first center main groove 13 and/or a first shoulder main groove 14. The center sipes 7 include hook-shaped center sipes 55 crossing the center land region 25, and the middle sipes 8 include hook-shaped middle sipes 45 crossing the first middle land region 23.

20 Claims, 12 Drawing Sheets

(56) References Cited

U.S. PATENT DOCUMENTS

| | | | |
|---|---|---|---|
| 2013/0153105 A1* | 6/2013 | Bournat | B60C 11/0309 |
| | | | 152/209.21 |
| 2016/0176235 A1* | 6/2016 | Takayama | B60C 11/0306 |
| | | | 152/209.2 |
| 2016/0185160 A1* | 6/2016 | Mukai | B60C 11/1307 |
| | | | 152/209.24 |
| 2018/0264892 A1* | 9/2018 | Wakizono | B60C 11/1236 |

* cited by examiner

TIRE

TECHNICAL FIELD

The present invention relates to a tire having both running performance on a dry road surface (hereinafter referred to as "dry steering stability") and running performance on an icy road surface (hereinafter referred to as "on-ice performance").

BACKGROUND ART

In a pneumatic tire, a large number of sipes are formed in a tread portion, and the on-ice performance is ensured by frictional force in digging a road surface (edge effect) caused by edges thereof (see Japanese unexamined Patent Application Publication No. 2015-168356, for example).

To increase this on-ice performance, the number and length of the sipes has been increased. However, an increase in the number and length of the sipes causes a decrease in block rigidity, therefore, the dry steering stability and the like are decreased. Thus, there is a trade-off between the on-ice performance and the dry steering stability, and further improvement is required to have both of them at a high level.

SUMMARY OF THE INVENTION

The present invention was made in view of the above, and a primary object thereof is to provide a tire having both the dry steering stability and the on-ice performance.

In one aspect of the present invention, a tire comprises a tread portion having a tread pattern including a center land region arranged on a tire equator, a first center main groove extending continuously in a tire circumferential direction on one side of the center land region in a tire axial direction, a first middle land region arranged adjacently to the center land region on the one side in the tire axial direction with the first center main groove therebetween, a first shoulder main groove extending continuously in the tire circumferential direction on the one side of the first middle land region in the tire axial direction, and a first shoulder land region arranged adjacently to the first middle land region on the one side in the tire axial direction with the first shoulder main groove therebetween, wherein the center land region is provided with a plurality of center sipes having open ends connected with the first center main groove, the first middle land region is provided with a plurality of middle sipes having open ends connected with the first center main groove and/or the first shoulder main groove, the center sipes include hook-shaped center sipes crossing the center land region, and the middle sipes include hook-shaped middle sipes crossing the first middle land region.

In another aspect of the invention, it is preferred that the first shoulder land region is provided with a plurality of shoulder sipes having open ends connected with the first shoulder main groove, each of the open ends of the center sipes connected with the first center main groove faces, in the tire axial direction, respective adjacent one of the open ends of the middle sipes connected with the first center main groove, and each of the open ends of the middle sipes connected with the first shoulder main groove faces, in the tire axial direction, respective adjacent one of the open ends of the shoulder sipes connected with the first shoulder main groove.

In another aspect of the invention, it is preferred that the center sipes comprise the hook-shaped center sipes and terminating center sipes having one ends terminating within the center land region, and the middle sipes comprise the hook-shaped middle sipes and terminating middle sipes having one ends terminating within the first middle land region.

In another aspect of the invention, it is preferred that each of the open ends of the hook-shaped center sipes connected with the first center main groove faces, in the tire axial direction, respective adjacent one of the open ends of the hook-shaped middle sipes connected with the first center main groove.

In another aspect of the invention, it is preferred that each of the hook-shaped middle sipes comprises an inner oblique portion extending obliquely with respect to the tire axial direction from the first center main groove, an outer oblique portion extending obliquely in a same direction as the inner oblique portion from the first shoulder main groove, and a middle oblique portion connecting between the inner and the outer oblique portions, and a length (Lb) of the outer oblique portion in the tire axial direction is smaller than a length (La) of the inner oblique portion in the tire axial direction.

In another aspect of the invention, it is preferred that the first middle land region is provided with a middle lateral groove crossing the first middle land region, and the middle lateral groove comprises an axially inner lateral groove portion extending parallel to the inner oblique portion and an axially outer lateral groove portion extending parallel to the outer oblique portion.

In another aspect of the invention, it is preferred that the terminating middle sipes include inner terminating middle sipes having open ends connected with the first center main groove and outer terminating middle sipes having open ends connected with the first shoulder main groove.

In another aspect of the invention, it is preferred that the tread pattern is an asymmetric pattern whose position when mounted on a vehicle is specified so that the one side in the tire axial direction of the tire is positioned on an axially inner side of the vehicle.

In this specification, "sipe" and "sipe portion" mean grooves having widths not greater than 1.5 mm, and opposing Sipe walls thereof come into contact with each other upon contacting the ground.

DESCRIPTION OF THE PREFERRED EMBODIMENT

An embodiment of the present invention will now be described in conjunction with accompanying drawings.

Figure 1:
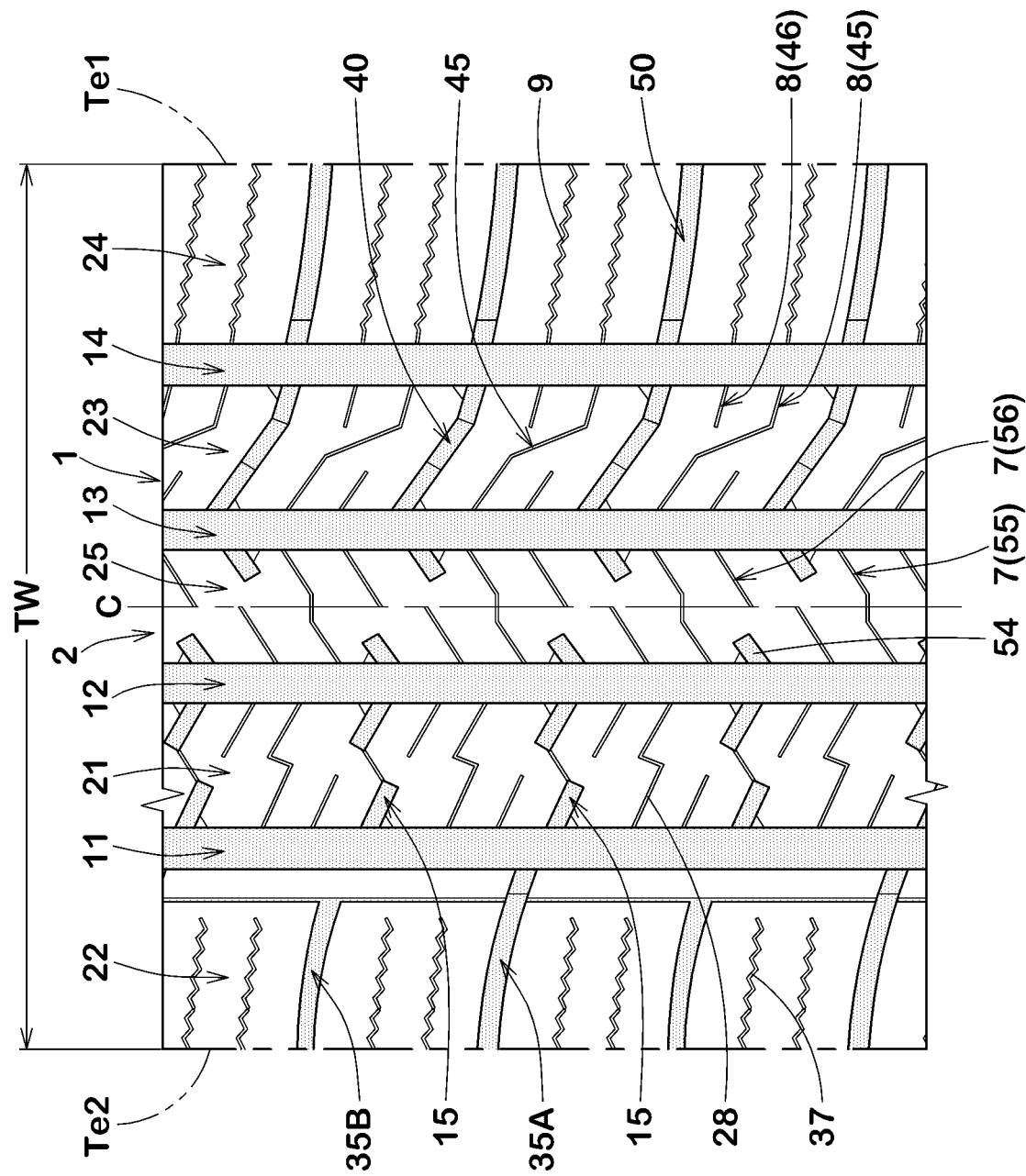
FIG. 1 is a development view of a tread portion of a tire according to an embodiment of the present invention.

FIG. 1 is a development view of a tread portion 2 of a tire 1 according to an embodiment of the present invention. The tire 1 in this embodiment can be used for various tires such as, for example, a pneumatic tire for a passenger car and for heavy duty, and non-pneumatic tire not filled with pressurized air (an airless tire, for example) and the like. FIG. 1 shows an example in which the tire 1 is formed as an all season tire for a passenger car.

As shown in FIG. 1, the tread portion 2 in this embodiment has an asymmetric tread pattern whose position when mounted on a vehicle is specified. In this embodiment, a first tread edge Te1 arranged on the right side in FIG. 1 is positioned on an axially inner side of the vehicle when mounted on the vehicle, and a second tread edge Te2 arranged on the left side in FIG. 1 is positioned on an axially outer side of the vehicle when mounted on the vehicle. However, the present invention is not limited to such an embodiment, but may be used for a tire whose position when mounted on a vehicle is not specified, for example.

In the case of a pneumatic tire, the first tread edge Te1 and the second tread edge Te2 are outermost ground contacting positions of the tire 1 in a tire axial direction when the tire 1 in a standard state is in contact with a flat surface with zero camber angle by being loaded with a standard load. Further, a distance in the tire axial direction between the first tread edge Te1 and the second tread edge Te2 is referred to as a tread width TW.

The "standard state" is a state in which the tire is mounted on a standard rim, inflated to a standard pressure, and loaded with no tire load. In this specification, dimensions and the like of various parts of the tire are those of the tire in the standard state, unless noted otherwise.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of main grooves extending continuously in a tire circumferential direction. The plurality of the main grooves include a first center main groove 13 and a first shoulder main groove 14 arranged between the tire equator (C) and the first tread edge Te1 and a second center main groove 12 and a second shoulder main groove 11 arranged between the tire equator (C) and the second tread edge Te2.

It is preferred that the first shoulder main groove 14 and the second shoulder main groove 11 are arranged such that groove center lines thereof are spaced apart from the tire equator (C) by a distance in a range of from 0.20 to 0.35 times the tread width TW, for example. It is preferred that the first center main groove 13 and the second center main groove 12 are arranged such that groove center lines thereof are spaced apart from the tire equator (C) by a distance in a range of from 0.05 to 0.15 times the tread width TW, for example.

It is preferred that a groove width of each of the main grooves 11 to 14 is in a range of from 3% to 7% of the tread width TW, for example. Further, it is preferred that a groove depth of each of the main grooves 11 to 14 is in about a range of from 5 to 10 mm in a case of a pneumatic tire, for example. However, the dimensions of the main grooves 11 to 14 are not limited to such ranges.

The tread portion 2 is provided with a plurality of land regions divided by the main grooves 11 to 14 described above. Specifically, the plurality of the land regions include a center land region 25, a first middle land region 23, a second middle land region 21, a first shoulder land region 24, and a second shoulder land region 22.

The center land region 25 is arranged on the tire equator (C). The first middle land region 23 is adjacent to the center land region 25 on one side (inner side of the vehicle) in the tire axial direction with the first center main groove 13 therebetween. The first shoulder land region 24 is adjacent to the first middle land region 23 on the one side (inner side of the vehicle) in the tire axial direction with the first shoulder main groove 14 therebetween. The second middle land region 21 is adjacent to the center land region 25 on the other side (outer side of the vehicle) in the tire axial direction with the second center main groove 12 therebetween. The second shoulder land region 22 is adjacent to the second middle land region 21 on the other side (outer side of the vehicle) in the tire axial direction with the second shoulder main groove 11 therebetween.

Figure 2:
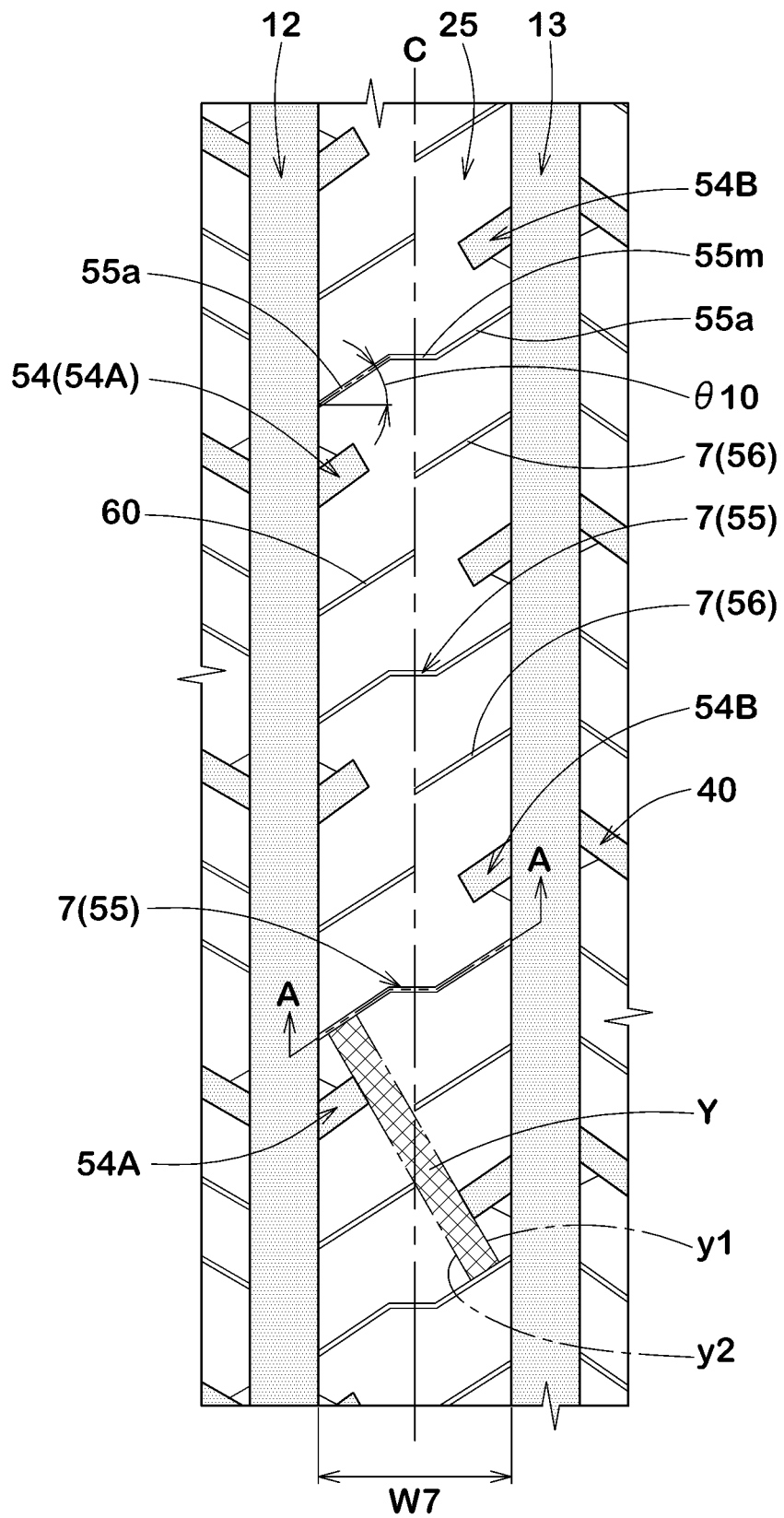
FIG. 2 is an enlarged view of a center land region.

FIG. 2 is an enlarged view of the center land region 25. As shown in FIG. 2, the center land region 25 is provided with a plurality of center sipes 7 each having an opening connected with the first center main groove 13. This center sipes 7 include hook-shaped center sipes 55 each crossing the center land region 25. The center sipes 7 in this embodiment include the hook-shaped center sipes 55 and terminating center sipes 56. Each of the terminating center sipes 56 has an open end connected with the first center main groove 13 and the other end terminating within the center land region 25. It is preferred that a width W7 in the tire axial direction of the center land region 25 is in a range of from 0.10 to 0.15 times the tread width TW, for example.

Each of the hook-shaped center sipes 55 includes a pair of side oblique portions (55a) extending respectively from the first center main groove 13 and the second center main groove 12 toward the tire equator (C), and a middle oblique portion (55m) extending so as to connect between the pair of the side oblique portions (55a).

The side oblique portions (55a) are inclined in a same direction with respect to the tire axial direction. It is preferred that an angle θ10 with respect to the tire axial direction of each of the side oblique portions (55a) is in a range of from 30 to 40 degrees, for example, in order to exert the edge effect in the tire axial direction and in the tire circumferential direction in a good balance. Further, it is preferred that the middle oblique portion (55m) extends, for example, at an angle not greater than 5 degrees with respect to the tire axial direction, that is, extends along the tire axial direction, for straight running stability.

Figure 3:
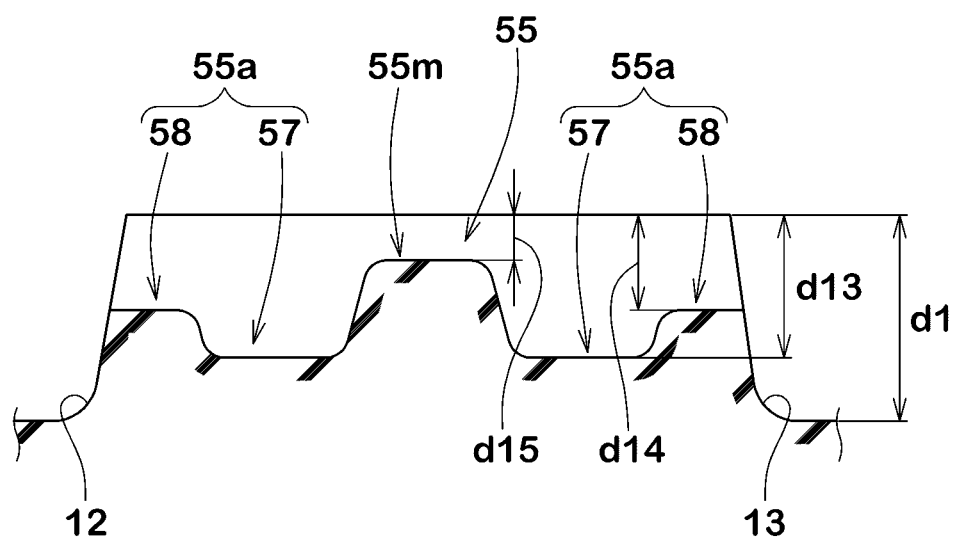
FIG. 3 is a cross-sectional view taken along A-A line of FIG. 2.

FIG. 3 is a cross-sectional view of one of the hook-shaped center sipes 55 taken along A-A line of FIG. 2. As shown in FIG. 3, in each of the hook-shaped center sipes 55, the middle oblique portion (55m) has a smaller depth than those of the side oblique portions (55a).

Each of the side oblique portions (55a) includes a deep bottom portion 57 and a shallow bottom portion 58 having a depth smaller than that of the deep bottom portion 57. The shallow bottom portions 58 are arranged, for example, at both ends in the tire axial direction of the hook-shaped center sipe 55. Each of the deep bottom portions 57 is arranged, for example, between the respective shallow bottom portion 58 and the middle oblique portion (55m). The hook-shaped center sipes 55 configured as such maintain rigidity of the center land region 25 high by the middle oblique portions (55m) and the shallow bottom portions 58.

It is preferred that depths (d13) of the deep bottom portions 57 of the hook-shaped center sipes 55 are in a range of from 0.65 to 0.75 times a depth (d1) of the first center main groove 13, for example. It is preferred that depths (d14) of the shallow bottom portions 58 are in a range of from 0.40 to 0.50 times the depth (d1) of the first center main groove 13, for example. It is preferred that depths (d15) of the middle oblique portions (55m) are, for example, in a range of from 0.15 to 0.25 times the depth (d1) of the first center main groove 13.

As shown in FIG. 2, each of the terminating center sipes 56 extends obliquely in the same direction as the side oblique portions (55a) with respect to the tire axial direction from the first center main groove 13, and terminates in the vicinity of the tire equator (C). The above vicinity means an area range in which the distance from the tire equator (C) is not greater than 3.0 mm. The terminating center sipes 56 in this embodiment are parallel to the side oblique portions (55a) and terminate on the tire equator (C). Note that the terminating center sipes 56 being parallel to the side oblique portions (55a) means that an angle between them is not greater than 5 degrees.

Like the side oblique portions (55a) (shown in FIG. 3), it is preferred that each of the terminating center sipes 56 includes a deep bottom portion and a shallow bottom portion having a depth smaller than that of the deep bottom portion (not shown). It is preferred that depths of the deep bottom portions and the shallow bottom portions of the terminating center sipes 56 are set in the same ranges as the depths (d13) of the deep bottom portions 57 and depths (d14) of the shallow bottom portions 58 of the side oblique portions (55a). The terminating center sipes 56 configured as such maintain the rigidity of the center land region 25 high by the shallow bottom portions.

As shown in FIG. 2, the center land region 25 in this embodiment is provided with sipes 60 which are not connected with the first center main groove 13 and center lug grooves 54 one ends of which terminate within the center land region 25, in addition to the center sipes 7 (that is, the hook-shaped center sipes 55 and the terminating center sipes 56).

The sipes 60 are terminating sipes extending obliquely in the same direction as the side oblique portions (55a) with respect to the tire axial direction from the second center main groove 12, and terminate in the vicinity of the tire equator (C). In the present embodiment, the sipes 60 and the terminating center sipes 56 have the same configuration except that the positions of the open ends are different from each other. Like the terminating center sipes 56, the sipes 60 configured as such maintain the rigidity of the center land region 25 high by the shallow bottom portions.

The center lug grooves 54 include first center lug grooves 54B and second center lug grooves 54A. The first center lug grooves 54B extend from the first center main groove 13 and terminate within the center land region 25. The second center lug grooves 54A extend from the second center main groove 12 and terminate within the center land region 25. It is preferred that each of the center lug grooves 54 is inclined in the same direction as the side oblique portions (55a).

In the center land region 25, the hook-shaped center sipes 55, the terminating center sipes 56, and the first center lug grooves 54B are arranged repeatedly in this order toward one side (lower side in FIGS. 1 and 2) in the tire circumferential direction. Further, the hook-shaped center sipes 55, the sipes 60, and the second center lug grooves 54A are arranged repeatedly in this order toward the other side (upper side in FIGS. 1 and 2) in the tire circumferential direction. Thereby, the terminating center sipes 56 and the second center lug grooves 54A are adjacent to each other in the tire axial direction and the sipes 60 and the first center lug grooves 54B are adjacent to each other in the tire axial direction. Such an arrangement increases uniformity of the rigidity in the tire circumferential direction, therefore, it is advantageous in terms of uneven wear resistance performance.

Further, in this embodiment, in the center land region 25, when an imaginary line passing through the terminating end of the terminating center sipe 56 and the terminating end of the first center lug groove 54B is referred to as an imaginary line (y1), and an imaginary line passing through the terminating end of the sipe 60 and the terminating end of the second center lug groove 54A is referred to as an imaginary line (y2), a highly rigid region (Y) (indicated by intersecting hatching) having no grooves or sipes is formed between the imaginary lines (y1) and (y2). The imaginary lines (y1) and (y2) are parallel to each other, and the highly rigid regions (Y) extend obliquely in a direction different from the terminating center sipes 56. It is preferred that each of the highly rigid regions (Y) includes an area sandwiched between the first center lug groove 54B and the second center lug groove 54A, and particularly, it is further preferred that each of the highly rigid regions (Y) extends so as to connect between a pair of the hook-shaped center sipes 55 adjacent in the tire circumferential direction. It is possible that the highly rigid regions (Y) configured as such contribute to increasing the rigidity of the center land region 25.

Figure 4:
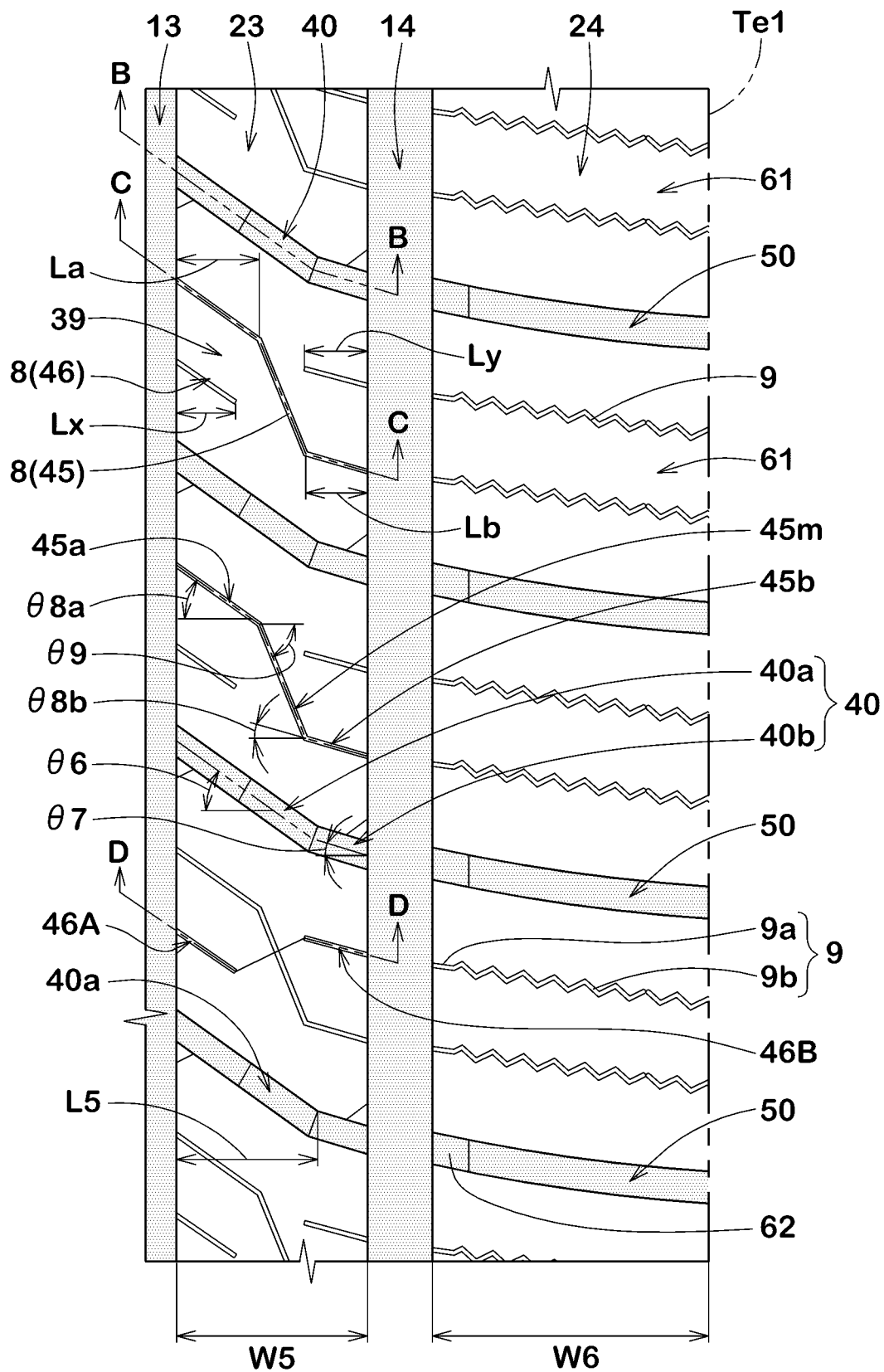
FIG. 4 is an enlarged view of a first middle land region and a first shoulder land region.

FIG. 4 is an enlarged view of the first middle land region 23 and the first shoulder land region 24. It is preferred that a width W5 of the first middle land region 23 in the tire axial direction is in a range of from 0.10 to 0.20 times the tread width TW. It is preferred that a width W6 of the first shoulder land region 24 in the tire axial direction is in a range of from 0.15 to 0.25 times the tread width TW.

The first middle land region 23 is provided with a plurality of middle sipes 8 each having an open end (or open ends) connected with the first center main groove 13 and/or the first shoulder main groove 14. The middle sipes 8 include hook-shaped middle sipes 45 crossing the first middle land region 23. In this embodiment, the middle sipes 8 include the hook-shaped middle sipes 45 and terminating middle sipes 46 one ends of which terminate within the first middle land region 23.

The first middle land region 23 in this embodiment is provided with a plurality of middle lateral grooves 40 extending so as to cross the first middle land region 23 in addition to the middle sipes 8. Thereby the first middle land region 23 is divided into a plurality of middle blocks 39. Each of the middle blocks 39 in this embodiment is provided with one hook-shaped middle sipe 45 and a pair of the terminating middle sipes 46 (an inner terminating middle sipe 46A and an outer terminating middle sipe 46B to be described later).

Each of the hook-shaped middle sipes 45 includes an inner oblique portion (45a) extending from the first center main groove 13, an outer oblique portion (45b) extending from the first shoulder main groove 14, and a middle oblique portion (45m) connecting between the inner oblique portion (45a) and the outer oblique portion (45b).

The inner and outer oblique portions (45a) and (45b) are inclined in an opposite direction to the side oblique portions (55a) of the hook-shaped center sipes 55 with respect to the tire axial direction. The middle oblique portions (45m) in this embodiment are inclined in the opposite direction to the side oblique portions (55a) with respect to the tire axial direction as well.

It is preferred that angles (θ8a) of the inner oblique portions (45a) with respect to the tire axial direction are in a range of from 30 to 40 degrees, for example. It is preferred that angles (θ8b) of the outer oblique portions (45b) with respect to the tire axial direction are smaller than the angles (θ8a), and specifically in a range of from 10 to 20 degrees. It is preferred that angles θ9 of the middle oblique portions (45m) with respect to the tire axial direction are larger than the angles (θ8a), and specifically in a range of from 65 to 75 degrees.

For the dry steering stability, it is preferred that lengths (Lb) of the outer oblique portions (45b) in the tire axial direction are smaller than lengths (La) of the inner oblique portions (45a) in the tire axial direction. In particular, it is preferred that the lengths (La) are in a range of from 0.4 to 0.5 times the width W5 of the first middle land region 23 in the tire axial direction. Further, it is preferred that the lengths (Lb) are in a range of from 0.1 to 0.3 times the width W5 of the first middle land region 23 in the tire axial direction.

Figure 5A:
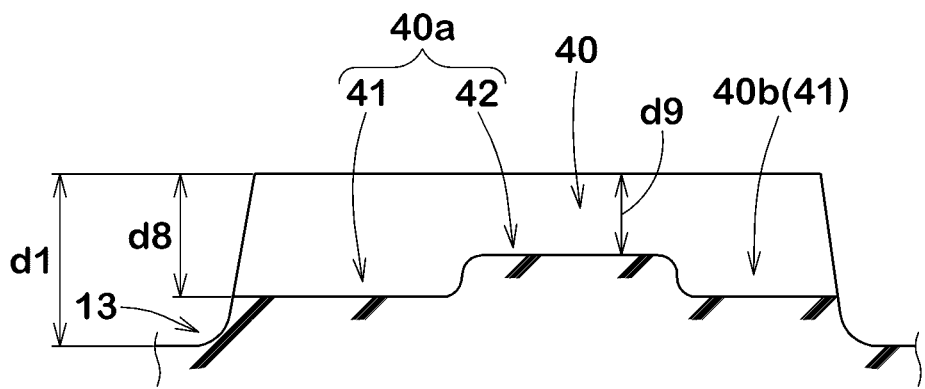
FIG. 5A is a cross-sectional view taken along B-B line of FIG. 4.
Figure 5B:
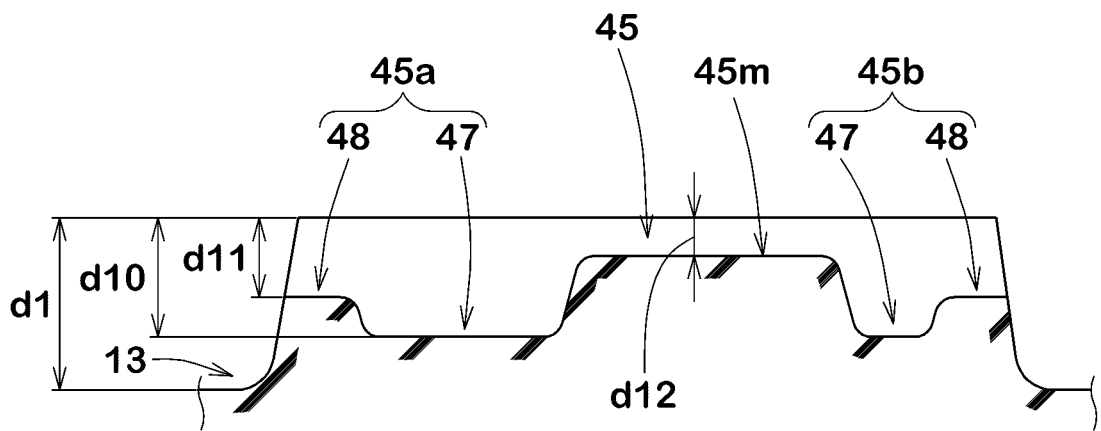
FIG. 5B is a cross-sectional view taken along C-C line of FIG. 4.

FIG. 5B is a cross-sectional view of one of the hook-shaped middle sipes 45 taken along C-C line of FIG. 4. As shown in FIG. 5B, in each of the hook-shaped middle sipes 45, the middle oblique portion (45m) has a smaller depth than those of the inner and outer oblique portions (45a) and (45b).

Each of the inner and outer oblique portions (45a) and (45b) includes a deep bottom portion 47 and a shallow bottom portion 48 having a depth smaller than that of the deep bottom portion 47. Each of the shallow bottom portions 48 is disposed, for example, at both ends of the hook-shaped middle sipe 45, and each of the deep bottom portions 47 is disposed between the respective shallow bottom portion 48 and the middle oblique portion (45m). The hook-shaped middle sipes 45 configured as such maintain the rigidity of the first middle land region 23 high by the middle oblique portions (45m) and the shallow bottom portions 48.

It is preferred that depths (d10) of the deep bottom portions 47 are in a range of from 0.65 to 0.75 times the depth (d1) of the first center main groove 13. It is preferred that depths (d11) of the shallow bottom portions 48 are in a range of from 0.40 to 0.50 times the depth (d1) of the first center main groove 13. It is preferred that depths (d12) of the middle oblique portions (45m) are in a range of from 0.15 to 0.25 times the depth (d1) of the first center main groove 13.

As shown in FIG. 4, the terminating middle sipes 46 include the inner terminating middle sipes 46A and the outer terminating middle sipes 46B. The inner terminating middle sipes 46A extend obliquely with respect to the tire axial direction from the first center main groove 13 and terminate within the first middle land region 23. Further, the outer terminating middle sipes 46B extend obliquely with respect to the tire axial direction from the first shoulder main groove 14 and terminate within the first middle land region 23. The inner and outer terminating middle sipes 46A and 46B are inclined in the same direction as the inner and outer oblique portions (45a) and (45b). It is preferred that lengths (Lx) of the inner terminating middle sipes 46A in the tire axial direction are in a range of from 60% to 80% of the lengths (La). It is preferred that lengths (Ly) of the outer terminating middle sipes 46B in the tire axial direction are in a range of from 90% to 110% of the lengths (Lb).

Figure 6:
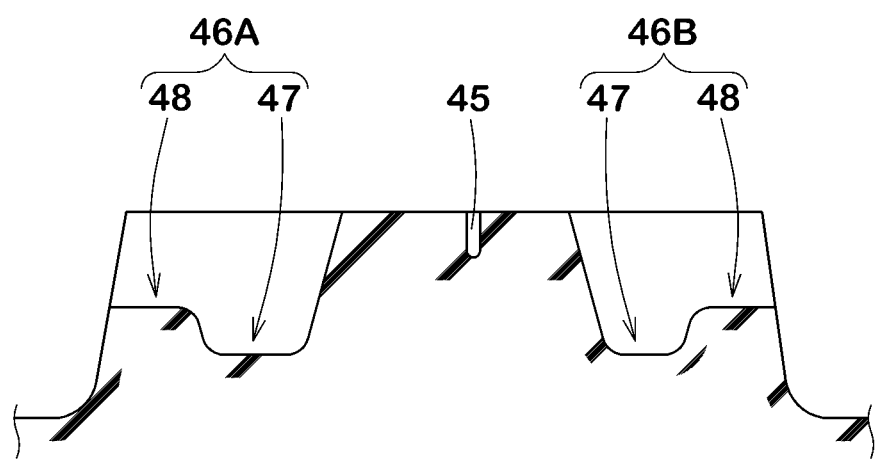
FIG. 6 is a cross-sectional view taken along D-D line of FIG. 4.

FIG. 6 is a cross-sectional view of the inner and the outer terminating middle sipes 46A and 46B taken along D-D line of FIG. 4. As shown in FIG. 6, each of the inner and the outer terminating middle sipes 46A and 46B includes, for example, a deep bottom portion 47 and a shallow bottom portion 48 having a smaller depth than that of the deep bottom portion 47. The shallow bottom portion 48 is formed at an end portion on a side of the main groove of each of the terminating middle sipes 46. It is preferred that depths of the deep bottom portions 47 and the shallow bottom portions 48 of the inner and the outer terminating middle sipes 46A and 46B are set within the same ranges as the deep bottom portions 47 and the shallow bottom portions 48 of the hook-shaped middle sipes 45 described above, for example. The inner and the outer terminating middle sipes 46A and 46B configured as such maintain the rigidity of the first middle land region 23 high by the shallow bottom portions 48.

As shown in FIG. 4, the middle lateral grooves 40 are inclined in the same direction as the hook-shaped middle sipes 45 with respect to the tire axial direction.

Each of the middle lateral grooves 40 includes an inner lateral groove portion (40a) disposed on an inner side in the tire axial direction and an outer lateral groove portion (40b) disposed on an outer side in the tire axial direction.

It is preferred that difference |θ6-θ8a| between an angle θ6 of the inner lateral groove portion (40a) with respect to the tire axial direction and the angle (θ8a) of the inner oblique portion (45a) is not greater than 10 degrees, further preferably not greater than 5 degrees.

The inner lateral groove portions (40a) extend beyond a width center position in the tire axial direction of the first middle land region 23 toward the first shoulder main groove 14, for example. It is preferred that lengths L5 of the inner lateral groove portions (40a) in the tire axial direction are in a range of from 0.65 to 0.80 times the width W5 of the first middle land region 23, for example.

It is preferred that angles θ7 of the outer lateral groove portions (40b) with respect to the tire axial direction are smaller than the angles θ6, particularly in a range of from 10 to 20 degrees. In this embodiment, the inner lateral groove portions (40a) are parallel to the inner terminating middle sipes 46A and the inner oblique portions (45a) and the outer lateral groove portions (40b) are parallel to the outer terminating middle sipes 46B and the outer oblique portions (45b). As described above, "parallel" means that the angular difference is not greater than 5 degrees.

FIG. 5A is a cross-sectional view of one of the middle lateral grooves 40 taken along B-B line of FIG. 4. As shown in FIG. 5A, it is preferred that each of the middle lateral grooves 40 includes deep bottom portions 41 and a shallow bottom portion 42 having smaller depth than that of the deep bottom portions 41.

More specifically, it is preferred that the inner lateral groove portion (40a) has the deep bottom portions 41 disposed on an inner side in the tire axial direction and the shallow bottom portion 42 disposed on an outer side in the tire axial direction, and the outer lateral groove portion (40b) is formed as the deep bottom portion 41. The middle lateral grooves 40 configured as such maintain the rigidity of the first middle land region 23 high by the shallow bottom portions 42.

It is preferred that depths (d8) of the deep bottom portions 41 are in a range of from 0.65 to 0.75 times the depth (d1) of the first center main groove 13. It is preferred that depths (d9) of the shallow bottom portions 42 are in a range of from 0.6 to 0.70 times the depths (d8) of the deep bottom portions 41.

In the first middle land region 23, the hook-shaped middle sipe 45, the middle lateral groove 40, and the outer terminating middle sipe 46B are formed repeatedly in this order toward one side (lower side in FIGS. 1 and 4) in the tire circumferential direction. Further, the hook-shaped middle sipe 45, the middle lateral groove 40, and the inner terminating middle sipe 46A are formed repeatedly in this order toward the other side (upper side in FIGS. 1 and 4) in the tire circumferential direction. Such an arrangement increases the uniformity of the rigidity in the tire circumferential direction, therefore, it is advantageous in terms of the uneven wear resistance performance.

As shown in FIG. 4, the first shoulder land region 24 is provided with a plurality of shoulder sipes 9 having open ends connected with the first shoulder main groove 14. Each of the shoulder sipes 9 includes a straight portion (9a) extending from the first shoulder main groove 14 and a zigzag portion (9b) extending in a zigzag manner between the straight portion (9a) and the first tread edge Te1. It is preferred that the shoulder sipes 9 are inclined in the same direction as the middle sipes 8 with respect to the tire axial direction, and in particular, it is preferred that angles of the shoulder sipes 9 with respect to the tire axial direction are smaller than the angles ($\theta 8b$) of the outer oblique portions (45b).

In addition to the shoulder sipes 9, the first shoulder land region 24 is provided with a plurality of shoulder lateral grooves 50 crossing the first shoulder land region 24. Thereby, the first shoulder land region 24 is divided into a plurality of shoulder blocks 61. Each of the shoulder blocks 61 is provided with two shoulder sipes 9. The shoulder lateral grooves 50 extend along shoulder sipes 9, and tie bars 62 formed by raising bottom surfaces thereof are disposed at inner end portions thereof.

Figure 7:
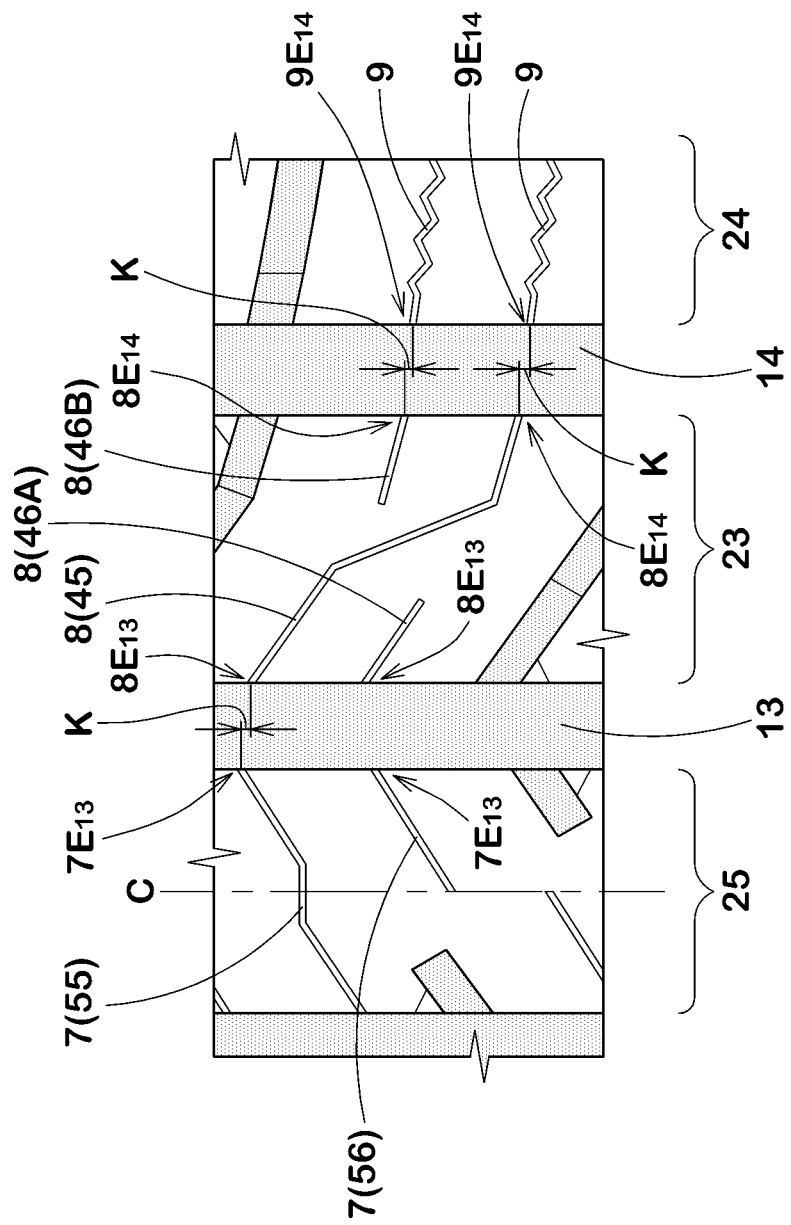
FIG. 7 is an enlarged view showing a state in which open ends of sipes face in the tire axial direction.

As shown enlarged in FIG. 7, open ends 7E13 connected with the first center main groove 13 of the center sipes 7 face, in the tire axial direction, open ends 8E13 connected with the first center main groove 13 of the middle sipes 8 on a one-to-one basis. Particularly in this embodiment, the open ends 7E13 of the hook-shaped center sipes 55 of the center sipes 7 face the open ends 8E13 of the hook-shaped middle sipes 45 of the middle sipes 8, and the open ends 7E13 of the terminating center sipes 56 of the center sipes 7 face the open ends 8E13 of the inner terminating middle sipes 46A of the middle sipes 8.

"The open ends 7E13 facing the open ends 8E13 in the tire axial direction" means that a distance (K) in the tire circumferential direction between a center of the open end 7E13 and a center of the open end 8E13 is not greater than 2.0 mm, and in particular, it is preferred that the distance (K) is not greater than 1.0 mm.

Similarly, open ends 8E14 connected with the first shoulder main groove 14 of the middle sipes 8 face, in the tire axial direction, open ends 9E14 connected with the first shoulder main groove 14 of the shoulder sipes 9 on a one-to-one basis. "The open ends 8E14 facing the open ends 9E14 in the tire axial direction" means that a distance (K) in the tire circumferential direction between a center of the open end 8E14 and a center of the open end 9E14 is not greater than 2.0 mm, and in particular, it is preferred that the distance (K) is not greater than 1.0 mm. Note that the pitch number of the center sipes 7, the pitch number of the middle sipes 8, and the pitch number of the shoulder sipes 9 are equal to each other.

In this way, the open ends 7E13 and the open ends 8E13 face in the tire axial direction, and the open ends 8E14 and the open ends 9E14 face in the tire axial direction. Here, for example, when two sipes facing each other are inclined in different directions from each other like the center sipes 7 and the middle sipes 8, the two sipes facing each other (the center sipe 7 and the middle sipe 8) start contacting with the ground almost at the same time when the tire rotates, therefore, it is possible that the frictional force in digging a road surface is exerted at the same time. Thereby, grip force on an icy road is increased, therefore, it is possible that the on-ice performance is improved. Note that when two sipes facing each other are inclined in the same direction like the middle sipe 8 and the shoulder sipe 9, the two sipes facing each other (the middle sipe 8 and the shoulder sipe 9) successively come into contact with the ground when the tire rotates, therefore, it is possible that the frictional force in digging a road surface is obtained continuously.

Further, the center sipes 7 include the hook-shaped center sipes 55 and the middle sipes 8 include the hook-shaped middle sipes 45. The hook-shaped center sipes 55 and the hook-shaped middle sipes 45 are formed in a bent hook shape, therefore, the edge components in the tire circumferential direction and in the tire axial direction are increased. Thereby, the frictional force in digging a road surface is increased in the tire circumferential direction and in the tire axial direction, therefore, it is possible that the on-ice performance is improved. Furthermore, opposing sipe walls thereof engage each other in a hook shape, therefore, it is possible that the block rigidity is maintained high even when the sipes cross the land region.

Particularly in this embodiment, the center sipes 7 include the hook-shaped center sipes 55 and the terminating center sipes 56, and the middle sipes 8 include the hook-shaped middle sipes 45 and the terminating middle sipes 46. The terminating center sipes 56 and the terminating middle sipes 46 have one ends thereof terminating within the land portion, therefore, it is possible that the block rigidity is maintained high.

Thereby, especially when combining these, the frictional force in digging a road surface itself is increased and the increased frictional force in digging a road surface is exerted at the same time, therefore, it is possible that the on-ice performance is improved more effectively. Further, the block rigidity can be maintained high, therefore, it is possible to have both the on-ice performance and the dry steering stability at a high level.

The angles ($\theta 8b$) of the outer oblique portions (45b) in this embodiment are smaller than the angles ($\theta 8a$) of the inner oblique portions (45a) and the lengths (Lb) of the outer oblique portion (45b) are smaller than the lengths (La) of the inner oblique portions (45a). Therefore, in a rigidity distribution of the middle blocks 39, the rigidity is larger on an outer side than on an inner side in the tire axial direction.

Thereby, it is possible that cornering force is increased, therefore, it is possible to contribute to improvement of the dry steering stability.

Each of the shoulder lateral grooves 50 in this embodiment is arranged on an extended line of one of the middle lateral grooves 40 adjacent thereto. Thereby, during running on a snowy road surface, it is possible that large snow blocks are formed by the middle lateral grooves 40, the shoulder lateral grooves 50, and the first shoulder main groove 14, therefore, it is possible that on-snow performance is improved.

Figure 8:
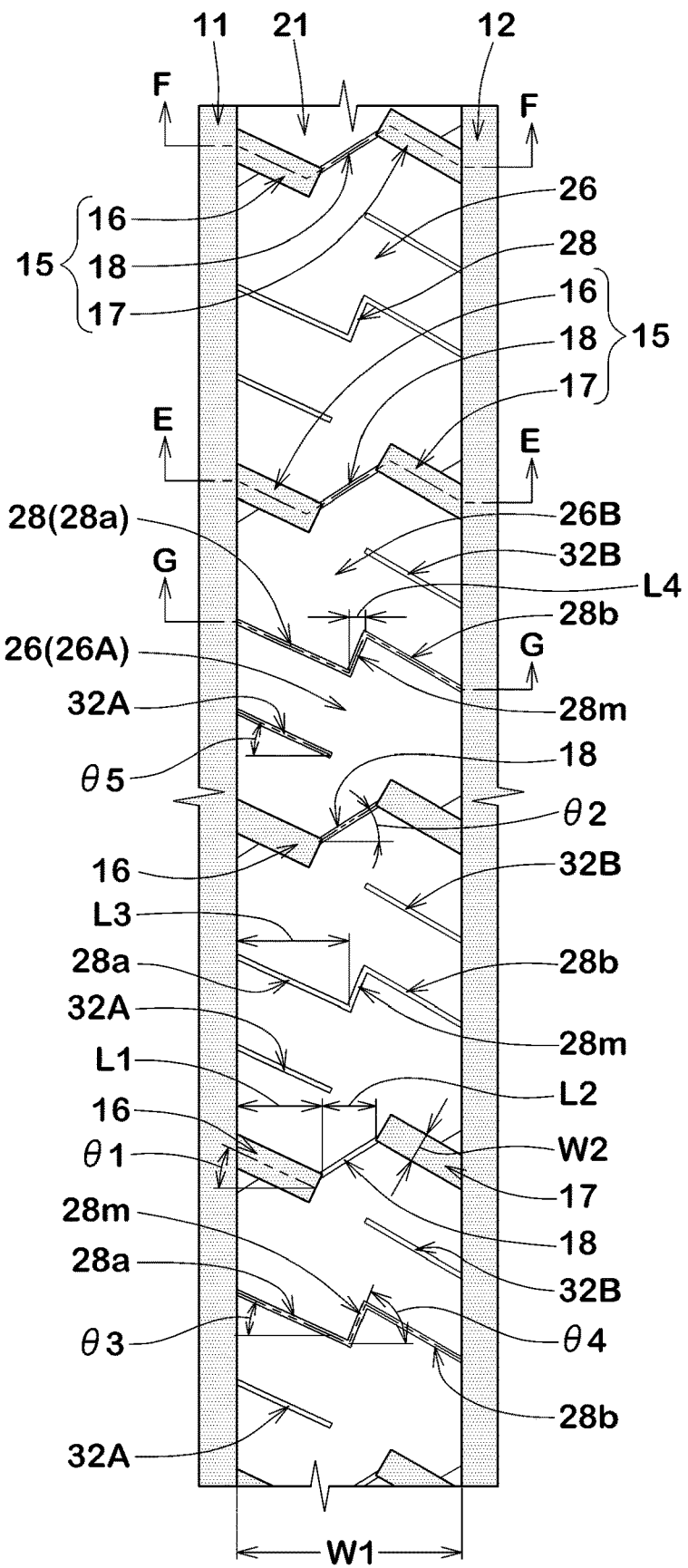
FIG. 8 is an enlarged view of a second middle land region.

FIG. 8 is an enlarged view of the second middle land region 21. As shown in FIG. 8, it is preferred that a width W1 of the second middle land region 21 in the tire axial direction is in a range of from 0.15 to 0.25 times the tread width TW. The second middle land region 21 is provided with a plurality of hook-shaped middle lateral grooves 15.

Each of the middle lateral grooves 15 include a first lug groove portion 16, a second lug groove portion 17, and a sipe portion 18. The first lug groove portion 16 extends from the second shoulder main groove 11 and is inclined with respect to the tire axial direction. The second lug groove portion 17 extends from the second center main groove 12 and is inclined in the same direction as the first lug groove portion 16. The sipe portion 18 extends so as to connect between the first lug groove portion 16 and the second lug groove portion 17 and is inclined in the opposite direction to the first lug groove portion 16.

The middle lateral grooves 15 include the sipe portions 18, therefore, it is possible that decrease in rigidity of the second middle land region 21 is prevented, thereby, it is possible to contribute to improvement of the dry steering stability. Further, during running on a snowy road surface, the first lug groove portions 16 and the second lug groove portions 17 of the middle lateral grooves 15 exert snow shearing force, therefore, it is possible to contribute to improvement of the on-snow performance. Furthermore, in the middle lateral grooves 15, the sipe portions 18 are inclined in the opposite direction to the first lug groove portions 16 and the second lug groove portions 17, thus, it is possible that the edge components in the tire circumferential direction and in the tire axial direction are increased, therefore, the frictional force in digging a road surface is increased, thereby, the on-ice performance is improved.

It is preferred that angles θ1 of the first lug groove portions 16 and the second lug groove portions 17 with respect to the tire axial direction are in a range of from 20 to 30 degrees, for example.

It is preferred that the first lug groove portions 16 and the second lug groove portions 17 terminate before reaching a center position in the tire axial direction of the second middle land region 21 without crossing it, for example. It is preferred that lengths L1 in the tire axial direction of the first lug groove portions 16 and the second lug groove portions 17 are in a range of from 0.30 to 0.40 times the width W1 of the second middle land region 21, for example.

It is preferred that angles θ2 of the sipe portions 18 with respect to the tire axial direction are in a range of from 25 to 40 degrees, for example. It is preferred that lengths L2 in the tire axial direction of the Sipe portion 18 are smaller than the lengths L1 of the first lug groove portions 16 and the second lug groove portions 17, and particularly it is preferred that the lengths L2 are in a range of from 0.65 to 0.75 times the lengths L1.

Figure 9A:
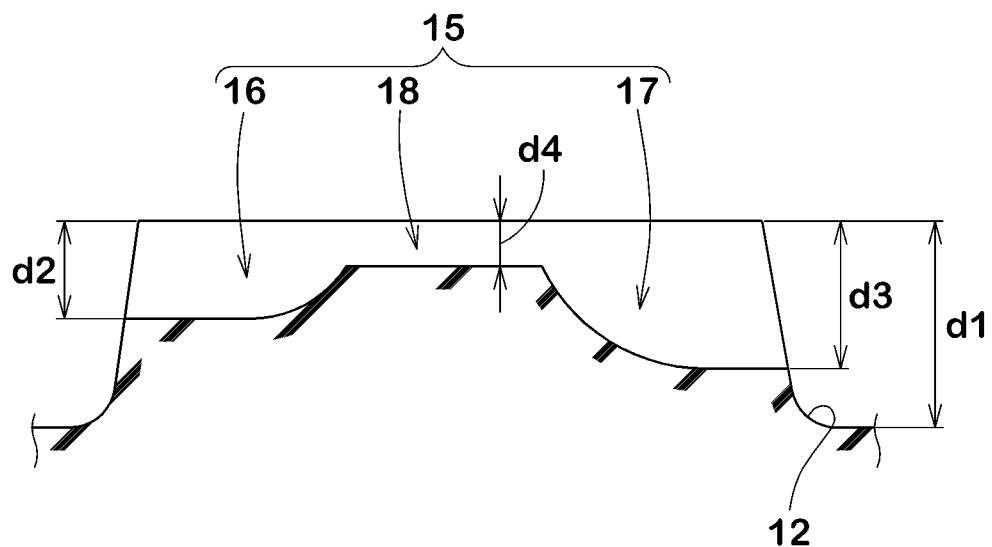
FIG. 9A is a cross-sectional view taken along E-E line of FIG. 8.
Figure 9B:
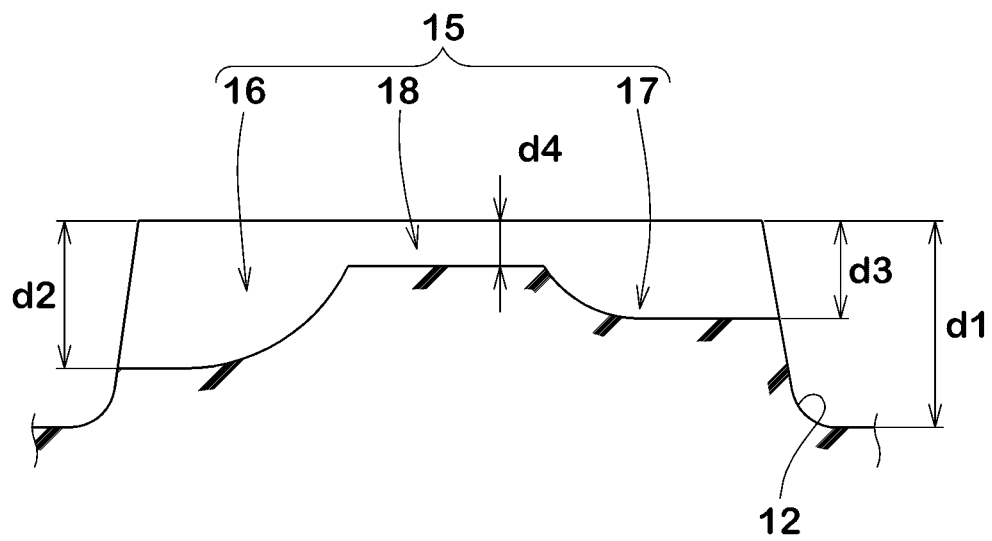
FIG. 9B is a cross-sectional view taken along F-F line of FIG. 8.

FIG. 9A is a cross-sectional view of one of the middle lateral grooves 15 taken along E-E line of FIG. 8, and FIG. 9B is a cross-sectional view of one of the middle lateral grooves 15 adjacent in the tire circumferential direction to the middle lateral groove 15 shown in FIG. 9A taken along F-F line of FIG. 8. As shown in FIGS. 9A and 9B, it is preferred that the first lug groove portions 16 have different depths from those of the second lug groove portions 17, for example.

In this embodiment, the middle lateral grooves 15 (shown in FIG. 9A) in which the first lug groove portions 16 have smaller depths than those of the second lug groove portions 17 and the middle lateral grooves 15 (shown in FIG. 9B) in which the second lug groove portions 17 have smaller depths than those of the first lug groove portions 16 are formed. As a more preferred embodiment, in this embodiment, these are alternately arranged in the tire circumferential direction. In such an embodiment, it is possible that the second middle land region 21 is uniformly worn. Further, with such arrangement of the lug groove portions, the second middle land region 21 is likely to deform irregularly, therefore, it is useful for discharging snow in the lug groove portions.

It is preferred that depths (d2) of the first lug groove portions 16 and the depths (d3) of the second lug groove portions 17 are in a range of from 0.45 to 0.75 times the depth (d1) of the second center main groove 12, for example. It is preferred that a ratio d2/d3 of the depths (d2) and the depths (d3) is in a range of from 0.6 to 1.8, for example.

The sipe portions 18 have constant depths (d4) and it is preferred that the depths (d4) are in a range of from 0.15 to 0.25 times the depth d1 of the second center main groove 12, for example.

As shown in FIG. 8, the second middle land region 21 is provided with a plurality of middle blocks 26 divided by a plurality of the middle lateral grooves 15. Each of the middle blocks 26 is provided with a hook-shaped middle sipe 28 extending so as to cross the second middle land region 21.

Each of the hook-shaped middle sipes 28 includes an outer oblique portion (28a), an inner oblique portion (28b), and a middle oblique portion (28m), for example.

The outer oblique portion (28a) extends from the second shoulder main groove 11 and is inclined in the same direction as the inner and the outer oblique portions (45a) and (45b) of the hook-shaped middle sipes 45. The inner oblique portion (28b) extends from the second center main groove 12 and is inclined in the same direction as the outer oblique portion (28a). The middle oblique portion (28m) is inclined in the opposite direction to the inner and the outer oblique portions (28a) and (28b) and extends so as to connect between the inner oblique portion (28a) and the outer oblique portion (28b).

Like the hook-shaped middle sipes 45, the hook-shaped middle sipes 28 increases the edge components in the tire circumferential direction and in the tire axial direction, therefore, the on-ice performance is improved. Further, opposing sipe walls of the hook-shaped middle sipes 28 engage each other in a hook shape, therefore, the block rigidity is maintained high even when the sipes cross the land region, thereby, the dry steering stability is improved.

It is preferred that angles θ3 of the inner and the outer oblique portions (28a) and (28b) with respect to the tire axial direction is in a range of from 20 to 30 degrees, for example. It is preferred that lengths L3 in the tire axial direction of the inner and the outer oblique portions (28a) and (28b) are larger than the lengths L2 of the first and the second lug groove portions 16 and 17 described above. In particular, it is preferred that the lengths L3 are in a range of from 0.45 to 0.55 times the width W1 of the second middle land region 21.

It is preferred that the middle oblique portion (28m) overlaps the sipe portion 18 in the tire axial direction when viewed in the tire circumferential direction. Thereby, uneven wear of the second middle land region 21 is suppressed.

It is preferred that the middle oblique portion (28m) are inclined at angles θ4 larger than those of the sipe portions 18 with respect to the tire axial direction, for example. It is particularly preferred that the angles θ4 of the middle oblique portions (28m) with respect to the tire axial direction are in a range of from 65 to 75 degrees.

It is preferred that the middle oblique portions (28m) have lengths L4 in the tire axial direction smaller than those of the sipe portions 18. It is preferred that the lengths L4 of the middle oblique portions (28m) are in a range of from 0.05 to 0.15 times the width W1 of the second middle land region 21, for example.

Figure 10:
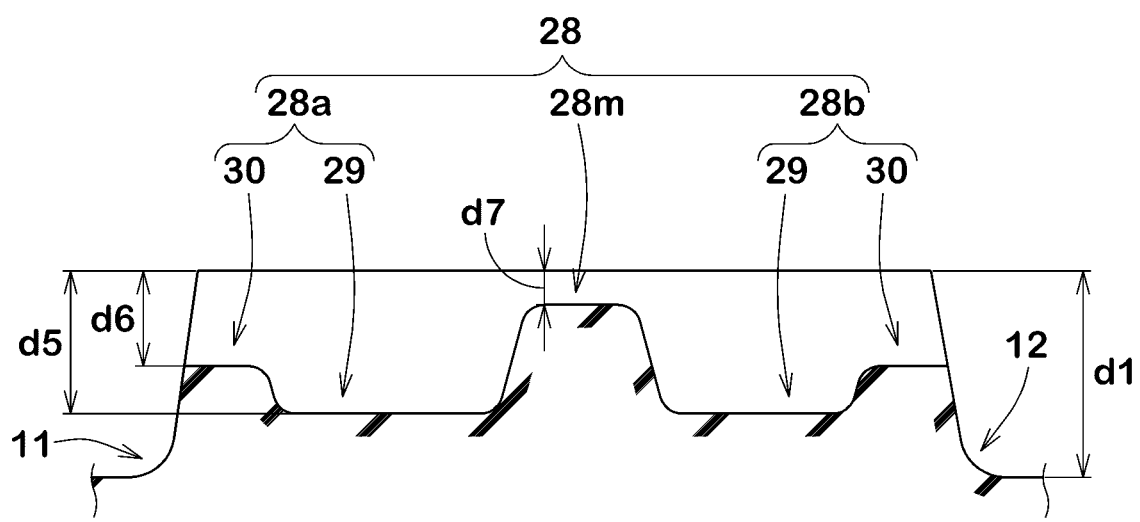
FIG. 10 is a cross-sectional view taken along G-G line of FIG. 8.

FIG. 10 is a cross-sectional view of one of the hook-shaped middle sipes 28 taken along G-G line of FIG. 8. As shown in FIG. 10, each of the outer oblique portion (28a) and the inner oblique portion (28b) includes a deep bottom portion 29 and a shallow bottom portion 30 having a depth smaller than that of the deep bottom portion 29. The shallow bottom portion 30 is formed at each end in the tire axial direction of the hook-shaped middle sipe 28, for example. The deep bottom portion 29 is formed between each of the shallow bottom portions 30 and the middle oblique portion (28m) of the hook-shaped middle sipe 28, for example. The hook-shaped middle sipes 28 configured as such maintain rigidity of the second middle land region 21 high by the middle oblique portions (28m) and the shallow bottom portions 30.

It is preferred that depths (d5) of the deep bottom portions 29 are in a range of from 0.65 to 0.75 times the depth (d1) of the second center main groove 12. It is preferred that depths (d6) of the shallow bottom portions 30 are in a range of from 0.60 to 0.70 times the depths (d5) of the deep bottom portions 29, for example.

It is preferred that the middle oblique portions (28m) have smaller depths (d7) than those of the outer oblique portions (28a) and the inner oblique portions (28b), for example. It is preferred that the depths (d7) of the middle oblique portions (28m) are in a range of from 0.20 to 0.30 times the depths (d5) of the deep bottom portions 29 of the outer oblique portions (28a), for example. Further, it is preferred that the depths (d7) of the middle oblique portions (28m) are not greater than 0.30 times the depth (d1) of the second center main groove 12.

As shown in FIG. 8, each of the middle blocks 26 is divided into a first block piece 26A and a second block piece 26B by the hook-shaped middle sipe 28. For example, the first block piece 26A is positioned on one side (lower side in FIG. 8) in the tire circumferential direction of the hook-shaped middle sipe 28, and the second block piece 26B is positioned on the other side (upper side in FIG. 8) in the tire circumferential direction of the hook-shaped middle sipe 28, for example. Each of the first and the second block pieces 26A and 26B is provided respectively with terminating sipes 32A and 32B having one ends terminating within the respective block piece.

The terminating sipes 32A provided in the first block pieces 26A extend from the second shoulder main groove 11, are inclined in the same direction as the outer oblique portions (28a), and terminate within the second middle land region 21. The terminating sipes 32B provided in the second block pieces 26B extend from the second center main groove 12, are inclined in the same direction as the inner oblique portions (28b), and terminate within the second middle land region 21. The terminating sipes 32A and 32B improve the on-ice performance by edges thereof while maintaining the rigidity of the second middle land region 21.

It is preferred that each of the terminating sipes 32A is arranged on an extended line of one of the second lug groove portions 17 adjacent thereto. Further, it is preferred that each of the terminating sipes 32B is arranged on an extended line of one of the first lug groove portions 16 adjacent thereto. Such arrangement of the terminating sipes 32A and 32B moderately promotes shearing deformation in the tire circumferential direction of the middle blocks 26, therefore, it is advantageous for suppressing snow clogging in the middle lateral grooves 15.

It is preferred that angles θ5 of the terminating sipes 32A and 32B with respect to the tire axial direction are in a range of from 20 to 30 degrees, for example. In particular, it is preferred that the terminating sipes 32A and 32B extend substantially parallel to the outer oblique portions (28a) or the inner oblique portions (28b) of the hook-shaped middle sipes 28, respectively.

Figure 11:
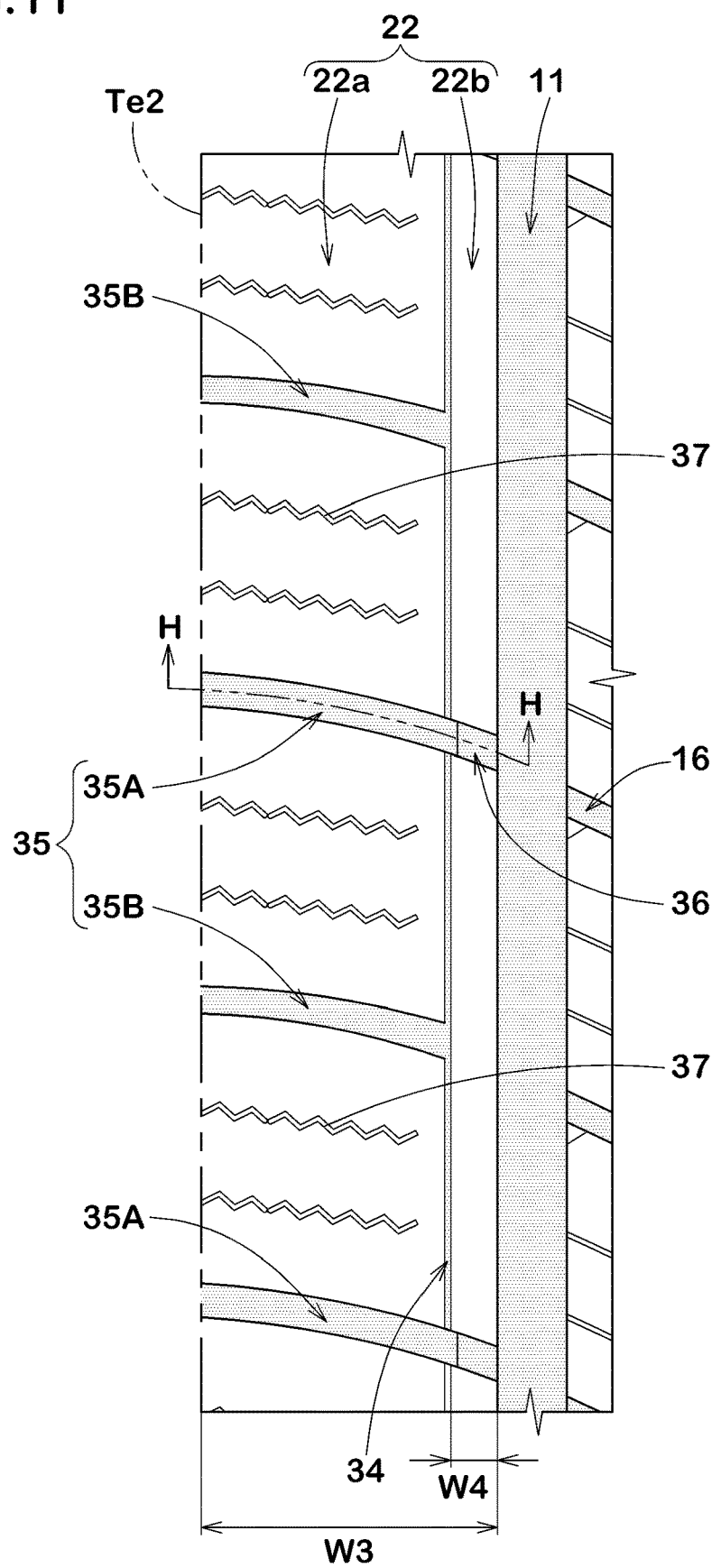
FIG. 11 is an enlarged view of a second shoulder land region.

FIG. 11 is an enlarged view of the second shoulder land region 22. It is preferred that a width W3 of the second shoulder land region 22 in the tire axial direction is in a range of from 0.15 to 0.30 times the tread width TW.

As shown in FIG. 11, the second shoulder land region 22 is divided into a main portion (22a) located on a side of the second tread edge Te2 and a narrow portion (22b) located on a side of the second shoulder main groove 11 by a circumferential sipe 34 extending along the second shoulder main groove 11. A width W4 of the narrow portion (22b) in the tire axial direction is in a range of from 0.10 to 0.20 times the width W3 of the second shoulder land region 22, for example.

The second shoulder land region 22 is provided with a plurality of shoulder lateral grooves 35. The shoulder lateral grooves 35 include first shoulder lateral grooves 35A extending between the second tread edge Te2 and the second shoulder main groove 11 and second shoulder lateral grooves 35B extending between the second tread edge Te2 and the circumferential sipe 34. The first shoulder lateral grooves 35A and the second shoulder lateral grooves 35B are arranged alternately in the tire circumferential direction.

Figure 12:
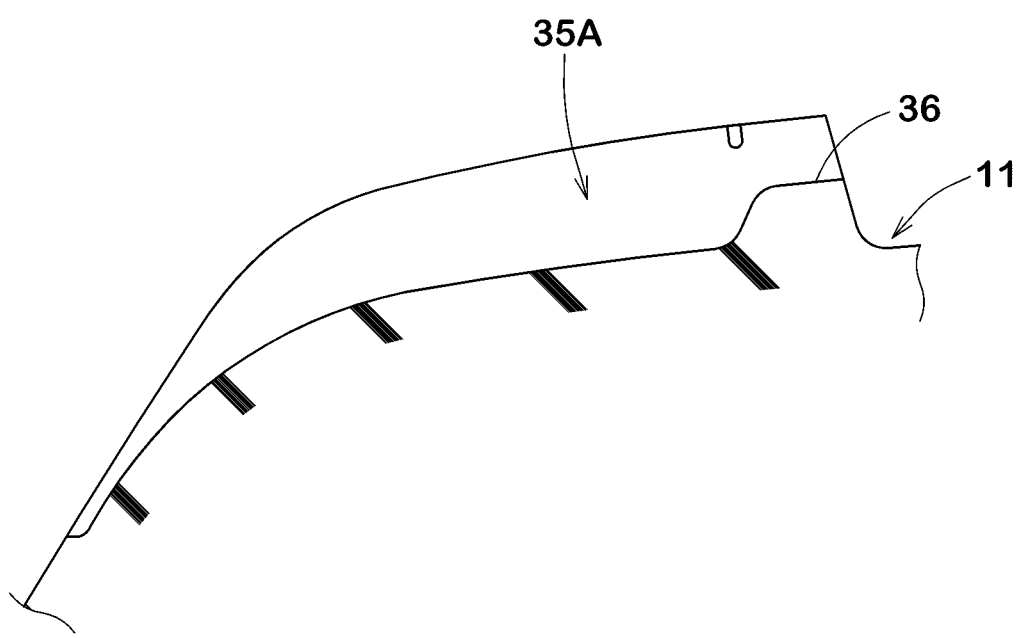
FIG. 12 is a cross-sectional view taken along H-H line of FIG. 11.

FIG. 12 is a cross-sectional view of one of the first shoulder lateral grooves 35A taken along H-H line in FIG. 11. As shown in FIG. 12, the first shoulder lateral groove 35A has a tie bar 36 formed by raising a bottom surface thereof at an inner end portion thereof. Thereby, rigidity of the second shoulder land region 22 is maintained high.

Inner ends of the second shoulder lateral grooves 35B terminate within the second shoulder land region 22, therefore, the rigidity of the second shoulder land region 22 is maintained high.

Shoulder sipes 37 extending in a zigzag manner in the tire axial direction are disposed between the first shoulder lateral groove 35A and the second shoulder lateral groove 35B. Inner ends of the shoulder sipes 37 terminate within the second shoulder land region 22, therefore, the rigidity of the second shoulder land region 22 is maintained high.

In this embodiment, the side oblique portions (55a) and the middle oblique portions (55m) which constitute the hook-shaped center sipes 55, the terminating center sipes 56, the inner and the outer oblique portions (45a) and (45b) and the middle oblique portions (45m) which constitute the hook-shaped middle sipes 45, and the terminating middle sipes 46 extend straight. However, other than extending straight, they may be curved in an arc shape, or they may extend in a zigzag shape (including a wavy shape) with respect to length directions thereof, for example. Note that if they are curved, angles of tangent lines thereof are set within the ranges of the angles described above, and if they extend in a zigzag shape, length directions thereof are set within the ranges of the angles described above.

While detailed description has been made of the pneumatic tire as an embodiment of the present invention, the present invention can be embodied in various forms without being limited to the illustrated embodiment.

Example (Working Example)

Tires of size 215/60R16 having the basic pattern shown in FIG. 1 were made by way of test according to the specifications listed in Table 1. Each of the test tires was tested for the on-ice performance and the dry steering stability. In Reference 1, the land regions 25 and 23 are provided with oblique sipes extending straight so as to cross the land regions 25 and 23, respectively, at a constant inclination angle. Further, in Examples 11 to 13, the open ends 7E13 and 8E13 are shifted by a half pitch in the tire circumferential direction, and the open ends 8E14 and 9E14 are shifted by a half pitch in the tire circumferential direction, therefore, they don't face each other. Common specifications and the test methods are as follows.

Tire Rim: 16×6.7
Tire pressure: 210 kPa
Test car: front wheel drive car with displacement of 2400 cc
Tire mounting position: all wheels <On-Ice Performance>

A distance needed for accelerating the above test car from 5 km/h to 20 km/h on an icy road surface was measured by GPS and an average acceleration was calculated. The results are indicated by an index based on the average acceleration of the Reference 1 being 100, wherein the larger the numerical value, the better the on-ice performance is.

<Dry Steering Stability>

While a driver drove the test car on a dry road surface, the steering stability was evaluated by the driver's feeling. The results are indicated by an index based on the Reference 1 being 100, wherein the larger the numerical value, the better the steering stability on a dry road surface is.

The test results are shown in Table 1.

TABLE 1

|  | Ref.1 | Ex.1 | Ex.2 | Ex.3 | Ex.4 | Ex.5 |
|---|---|---|---|---|---|---|
| Open ends 7E13 of Center sipes face Open ends 8E13 of Middle sipes or not |  |  |  | face |  |  |
| Open ends 8E14 of Middle sipes face Open ends 9E14 of Shoulder sipes or not |  |  |  | face |  |  |
| Center sipes |  |  |  |  |  |  |
| Presence or Absence of Hook-shaped sipes | Absence |  |  |  | Presence |  |
| Presence or Absence of Terminating sipes |  |  |  |  | Presence |  |
| Middle sipes |  |  |  |  |  |  |
| Presence or Absence of Hook-shaped sipes | Absence |  |  |  | Presence |  |
| Presence or Absence of Terminating sipes |  |  |  |  | Presence |  |
| Angles θ6 of Middle lateral grooves [degree] | 50 |  | 55 | 60 | 55 | 55 |
| Hook-shaped middle sipes |  |  |  |  |  |  |
| Angles θ8a [degree] | 50 |  | 55 | 60 | 65 | 45 |
| Difference \|θ6-θ8a\| |  | 0 |  |  | -10 | +10 |
| Lengths La/W5 |  |  |  |  | 0.45 |  |
| Lengths Lb/W5 |  | 0.25 |  |  | 0.2 | 0.25 |
| (Magnitude Relationship between La and Lb) |  |  |  |  | La > Lb |  |
| Dry steering stability | 100 | 102 | 104 | 102 | 101 | 103 |
| On-ice performance | 100 | 108 | 110 | 108 | 110 | 107 |

|  | Ex.6 | Ex.7 | Ex.8 | Ex.9 | Ex.10 | Ex.11 | Ex.12 | Ex.13 |
|---|---|---|---|---|---|---|---|---|
| Open ends 7E13 of Center sipes face Open ends 8E13 of Middle sipes or not |  |  | face |  |  | not | face | not |
| Open ends 8E14 of Middle sipes face Open ends 9E14 of Shoulder sipes or not |  |  | face |  |  | face | not | not |
| Center sipes |  |  |  |  |  |  |  |  |
| Presence or Absence of Hook-shaped sipes |  |  |  |  | Presence |  |  |  |
| Presence or Absence of Terminating sipes |  |  |  |  | Presence |  |  |  |
| Middle sipes |  |  |  |  |  |  |  |  |
| Presence or Absence of Hook-shaped sipes |  |  |  |  | Presence |  |  |  |
| Presence or Absence of Terminating sipes |  |  |  |  | Presence |  |  |  |
| Angles θ6 of Middle lateral grooves [degree] | 55 |  |  |  |  |  | 50 |  |

TABLE 1-continued

| Hook-shaped middle sipes | | | | | | | | |
|---|---|---|---|---|---|---|---|---|
| Angles θ8a [degree] | 55 | | | | | 50 | | |
| Difference \|θ6-θ8a\| | | | | 0 | | | | |
| Lengths La/W5 | 0.4 | 0.5 | 0.45 | 0.45 | 0.25 | | 0.45 | |
| Lengths Lb/W5 | 0.25 | 0.25 | 0.1 | 0.3 | 0.4 | | 0.25 | |
| (Magnitude Relationship between La and Lb) | La > Lb | | | La < Lb | | | La > Lb | |
| Dry steering stability | 100 | 104 | 104 | 100 | 100 | 102 | 102 | 102 |
| On-ice performance | 110 | 105 | 105 | 110 | 108 | 106 | 106 | 104 |

From the result of the tests, it was confirmed that the tires as the Examples showed the dry steering stability and the on-ice performance both at a high level.

The invention claimed is:

1. A tire comprising:
a tread portion having a tread pattern including a center land region arranged on a tire equator, a first center main groove extending continuously in a tire circumferential direction on one side of the center land region in a tire axial direction, a first middle land region arranged adjacently to the center land region on the one side in the tire axial direction with the first center main groove therebetween, a first shoulder main groove extending continuously in the tire circumferential direction on the one side of the first middle land region in the tire axial direction, and a first shoulder land region arranged adjacently to the first middle land region on the one side in the tire axial direction with the first shoulder main groove therebetween, wherein
the center land region is provided with a plurality of center sipes having open ends connected with the first center main groove,
the first middle land region is provided with a plurality of middle sipes having open ends connected with the first center main groove and/or the first shoulder main groove, and a plurality of middle lateral grooves extending so as to cross the first middle land region completely in the tire axial direction,
the center sipes include hook-shaped center sipes crossing the center land region,
each of the hook-shaped center sipes comprising a pair of side oblique portions extends respectively from the first center main groove and a second center main groove toward the tire equator, and a middle oblique portion extending so as to connect the pair of side oblique portions,
the middle oblique portion extends at an angle not greater than 5 degrees with respect to the tire axial direction,
the middle sipes include hook-shaped middle sipes crossing the first middle land region,
each of the hook-shaped middle sipes comprises an inner oblique portion extending obliquely with respect to the tire axial direction from the first center main groove, an outer oblique portion extending obliquely in a same direction as the inner oblique portion from the first shoulder main groove, and a middle oblique portion connecting the inner to the outer oblique portions,
a length (Lb) of the outer oblique portion in the tire axial direction is smaller than a length (La) of the inner oblique portion in the tire axial direction,
the length (La) is in a range of from 0.4 to 0.5 times a width W5 in the tire axial direction of the first middle land region, and
the length (Lb) is in a range of from 0.1 to 0.3 times the width W5 of the first middle land region.

2. The tire according to claim 1, wherein
the center sipes comprise the hook-shaped center sipes and terminating center sipes having one ends terminating within the center land region, and
the middle sipes comprise the hook-shaped middle sipes and terminating middle sipes having one ends terminating within the first middle land region.

3. The tire according to claim 1, wherein
each of the open ends of the hook-shaped center sipes connected with the first center main groove faces, in the tire axial direction, a respective adjacent one of the open ends of the hook-shaped middle sipes connected with the first center main groove in such a manner that a distance (K) in the tire circumferential direction between a center of each of the open ends of the hook-shaped center sipes and a center of a respective adjacent one of the open ends of the hook-shaped middle sipes is not greater than 2.0 mm.

4. The tire according to claim 1, wherein
the middle sipes comprise the hook-shaped middle sipes and terminating middle sipes having one ends terminating within the first middle land region, the terminating middle sipes comprising inner terminating middle sipes having open ends connected with the first center main groove and outer terminating middle sipes having open ends connected with the first shoulder main groove,
each of the plurality of middle lateral grooves comprises an axially inner lateral groove portion extending parallel to the inner oblique portion and an axially outer lateral groove portion extending parallel to the outer oblique portion, and
the axially inner lateral groove portion extends parallel to the inner terminating middle sipes and the axially outer lateral groove portion extends parallel to the outer terminating middle Sipes.

5. The tire according to claim 4, wherein
each of the hook-shaped middle sipes includes an inner oblique portion extending from the first center main groove, an outer oblique portion extending from the first shoulder main groove, and a middle oblique portion connecting the inner oblique portion to the outer oblique portion, and
the inner oblique portion, the outer oblique portion, and the middle oblique portion are different in angle with respect to the tire axial direction from one another.

6. The tire according to claim 1, wherein
the middle sipes comprise the hook-shaped middle sipes and terminating middle sipes having one ends terminating within the first middle land region,
the terminating middle sipes include inner terminating middle sipes having open ends connected with the first center main groove and outer terminating middle sipes having open ends connected with the first shoulder main groove.

7. The tire according to claim 1, wherein
the tread pattern is an asymmetric pattern whose position when mounted on a vehicle is specified so that the one side in the tire axial direction of the tire is positioned on an axially inner side of the vehicle.

8. The tire according to claim 1, wherein
the middle lateral groove comprises an axially inner lateral groove portion extending parallel to the inner oblique portion and an axially outer lateral groove portion extending parallel to the outer oblique portion,
an angle ($\theta 8b$) of the outer oblique portion with respect to the tire axial direction is smaller than an angle ($\theta 8a$) of the inner oblique portion with respect to the tire axial direction,
the angle ($\theta 8a$) of the inner oblique portions is in a range of from 30 to 40 degrees, and
the angle ($\theta 8b$) of the outer oblique portion is in a range of from 10 to 20 degrees.

9. The tire according to claim 1, wherein
each of the hook-shaped middle sipes consists of an inner oblique portion extending from the first center main groove, an outer oblique portion extending from the first shoulder main groove, and a middle oblique portion connecting the inner oblique portion to the outer oblique portion, and
the inner oblique portion, the outer oblique portion, and the middle oblique portion are different in angle with respect to the tire axial direction from one another.

10. The tire according to claim 9, wherein
an angle ($\theta 8a$) of the inner oblique portion with respect to the tire axial direction is in a range of from 30 to 40 degrees,
an angle ($\theta 8b$) of the outer oblique portion with respect to the tire axial direction is in a range of from 10 to 20 degrees, and
an angle ($\theta 9$) of the middle oblique portion with respect to the tire axial direction is in a range of from 65 to 75 degrees.

11. The tire according to claim 1, wherein
a length of the middle oblique portion is greater than lengths of the inner oblique portion and the outer oblique portion.

12. The tire according to claim 1, wherein
the middle oblique portion has a smaller depth than those of the inner and outer oblique portions.

13. The tire according to claim 12, wherein
the depth of the middle oblique portion is in a range of from 0.15 to 0.25 times a depth of the first center main groove.

14. The tire according to claim 1, wherein
an angle $\theta 10$ of each of the side oblique portions is in a range from 30 to 40 degrees with respect to the tire axial direction.

15. A tire comprising:
a tread portion having a tread pattern including a center land region arranged on a tire equator, a first center main groove extending continuously in a tire circumferential direction on one side of the center land region in a tire axial direction, a first middle land region arranged adjacently to the center land region on the one side in the tire axial direction with the first center main groove therebetween, a first shoulder main groove extending continuously in the tire circumferential direction on the one side of the first middle land region in the tire axial direction, and a first shoulder land region arranged adjacently to the first middle land region on the one side in the tire axial direction with the first shoulder main groove therebetween, wherein
the center land region is provided with a plurality of center sipes having open ends connected with the first center main groove,
the first middle land region is provided with a plurality of middle sipes having open ends connected with the first center main groove and/or the first shoulder main groove, and a plurality of middle lateral grooves extending so as to cross the first middle land region completely in the tire axial direction,
the center sipes include hook-shaped center sipes crossing the center land region and terminating center sipes each having one end terminating within the center land region and an open end connected with the first center main groove,
the middle sipes include hook-shaped middle sipes crossing the first middle land region, and inner terminating middle sipes each having one end terminating within the middle land region and an open end connected with the first center main groove,
each of the open ends of the hook-shaped center sipes connected with the first center main groove faces, in the tire axial direction, a respective adjacent one of the open ends of the hook-shaped middle sipes connected with the first center main groove in such a manner that a distance (K) in the tire circumferential direction between a center of each of the open ends of the hook-shaped center sipes and a center of a respective adjacent one of the open ends of the hook-shaped middle sipes is not greater than 2.0 mm, and
each of the open ends of the terminating center sipes faces, in the tire axial direction, a respective adjacent one of the open ends of the inner terminating middle sipes in such a manner that a distance (K) in the tire circumferential direction between a center of each of the open ends of the terminating center sipes and a center of a respective adjacent one of the open ends of the inner terminating middle sipes is not greater than 2.0 mm.

16. The tire according to claim 15, wherein
the distance (K) is not greater than 1.0 mm.

17. The tire according to claim 15, wherein
the middle lateral groove comprises an axially inner lateral groove portion extending parallel to the inner oblique portion and an axially outer lateral groove portion extending parallel to the outer oblique portion,
an angle ($\theta 8b$) of the outer oblique portion with respect to the tire axial direction is smaller than an angle ($\theta 8a$) of the inner oblique portion with respect to the tire axial direction,
the angle ($\theta 8a$) of the inner oblique portions is in a range of from 30 to 40 degrees, and
the angle ($\theta 8b$) of the outer oblique portion is in a range of from 10 to 20 degrees.

18. A tire comprising:
a tread portion having a tread pattern including a center land region arranged on a tire equator, a first center main groove extending continuously in a tire circumferential direction on one side of the center land region in a tire axial direction, a first middle land region arranged adjacently to the center land region on the one side in the tire axial direction with the first center main groove therebetween, a first shoulder main groove extending continuously in the tire circumferential direction on the one side of the first middle land region in the tire axial direction, and a first shoulder land region arranged adjacently to the first middle land region on the one side in the tire axial direction with the first shoulder main groove therebetween, wherein the center land region is provided with a plurality of center sipes having open ends connected with the first center main groove, the first middle land region is provided with a plurality of middle sipes having open ends connected with the first center main groove and/or the first shoulder main groove, and a plurality of middle lateral grooves extending so as to cross the first middle land region completely in the tire axial direction, the center sipes include hook-shaped center sipes crossing the center land region, the middle sipes include hook-shaped middle sipes crossing the first middle land region and outer terminating middle sipes having one end terminating within the middle land region and an open end connected with the first shoulder main groove, each of the hook-shaped middle sipes comprises an inner oblique portion extending obliquely with respect to the tire axial direction from the first center main groove, an outer oblique portion extending obliquely in a same direction as the inner oblique portion from the first shoulder main groove, and a middle oblique portion connecting the inner to the outer oblique portions, a length (Lb) of the outer oblique portion in the tire axial direction is smaller than a length (La) of the inner oblique portion in the tire axial direction, the length (La) is in a range of from 0.4 to 0.5 times a width W5 in the tire axial direction of the first middle land region, the length (Lb) is in a range of from 0.1 to 0.3 times the width W5 of the first middle land region, the first shoulder land region is provided with a plurality of shoulder sipes having open ends connected with the first shoulder main groove, each of the open ends of the hook-shaped middle sipes connected with the first shoulder main groove faces, in the tire axial direction, a respective adjacent one of the open ends of the shoulder sipes connected with the first shoulder main groove in such a manner that a distance (K) in the tire circumferential direction between a center of each of the open ends of the hook-shaped middle sipes and a center of a respective adjacent one of the open ends of the shoulder sipes is not greater than 2.0 mm, and each of the open ends of the outer terminating middle sipes connected with the first shoulder main groove faces, in the tire axial direction, a respective adjacent one of the open ends of the shoulder sipes connected with the first shoulder main groove in such a manner that a distance (K) in the tire circumferential direction between a center of each of the open ends of the outer terminating middle sipes and a center of a respective adjacent one of the open ends of the shoulder sipes is not greater than 2.0 mm.

19. The tire according to claim 18, wherein the distance (K) is not greater than 1.0 mm.

20. The tire according to claim 18, wherein the middle oblique portion has a smaller depth than those of the inner and outer oblique portions.

* * * * *